US010465034B2

United States Patent
Mager et al.

(10) Patent No.: US 10,465,034 B2
(45) Date of Patent: Nov. 5, 2019

(54) CRYSTALLIZATION STABLE POLYESTER PREPOLYMERS

(71) Applicant: Covestro Deutschland AG, Leverkusen (DE)

(72) Inventors: Dieter Mager, Leverkusen (DE); Hans-Josef Laas, Odenthal (DE); Karl-Heinrich Wührer, Köln (DE)

(*) Notice: Subject to any disclaimer, the term of this patent is extended or adjusted under 35 U.S.C. 154(b) by 51 days.

(21) Appl. No.: 15/544,037

(22) PCT Filed: Jan. 15, 2016

(86) PCT No.: PCT/EP2016/050813
§ 371 (c)(1),
(2) Date: Jul. 17, 2017

(87) PCT Pub. No.: WO2016/116376
PCT Pub. Date: Jul. 28, 2016

(65) Prior Publication Data
US 2018/0002479 A1    Jan. 4, 2018

(30) Foreign Application Priority Data

Jan. 20, 2015  (EP) .................................. 15151867

(51) Int. Cl.
| | | |
|---|---|---|
| C08F 2/46 | (2006.01) | |
| C08F 2/50 | (2006.01) | |
| C08G 61/04 | (2006.01) | |
| C08G 18/12 | (2006.01) | |
| C08G 18/73 | (2006.01) | |
| C08G 18/79 | (2006.01) | |
| C08G 18/10 | (2006.01) | |
| C09D 175/06 | (2006.01) | |
| C08G 18/42 | (2006.01) | |
| C09J 175/06 | (2006.01) | |

(52) U.S. Cl.
CPC .............. *C08G 18/12* (2013.01); *C08G 18/10* (2013.01); *C08G 18/4202* (2013.01); *C08G 18/4238* (2013.01); *C08G 18/4241* (2013.01); *C08G 18/4277* (2013.01); *C08G 18/73* (2013.01); *C08G 18/792* (2013.01); *C08G 18/798* (2013.01); *C09D 175/06* (2013.01); *C09J 175/06* (2013.01)

(58) Field of Classification Search
CPC .... C08G 18/12; C08G 18/73; C08G 18/4238; C08G 18/4202; C08G 18/4277; C08G 18/4241; C08G 18/10; C08G 18/42; C08G 18/792; C08G 18/798; C09J 175/06; C09D 175/06
USPC .......................................... 528/68, 44; 520/1
See application file for complete search history.

(56) References Cited

U.S. PATENT DOCUMENTS

| | | | |
|---|---|---|---|
| 4,837,359 A | 6/1989 | Woynar et al. | |
| 4,960,848 A | 10/1990 | Scholl et al. | |
| 4,994,541 A | 2/1991 | Dell et al. | |
| 5,076,958 A | 12/1991 | Pedain et al. | |
| 5,126,170 A | 6/1992 | Zweiner et al. | |
| 5,914,383 A | 6/1999 | Richter et al. | |
| 6,632,913 B2 | 10/2003 | Matsumoto et al. | |
| 6,747,117 B2 | 6/2004 | Gajewski | |
| 2002/0040071 A1* | 4/2002 | Lin .................. | C08G 18/10 521/155 |
| 2004/0067315 A1 | 4/2004 | Niesten et al. | |
| 2005/0124777 A1 | 6/2005 | Rosenberg et al. | |

FOREIGN PATENT DOCUMENTS

| | | |
|---|---|---|
| CA | 1335990 | 6/1995 |
| GB | 1145952 | 3/1969 |
| JP | 09-151230 | * 6/1997 |

OTHER PUBLICATIONS

Anzai et al, JP 09-151230 Machine Translation, Jun. 10, 1997 (Year: 1997).*
Laas et al., The Synthesis of Aliphatic Polyisocyanates Containing Biuret, Isocyanurate or Uretdione Backbones for Use in Coatings, vol. 336, 1994, pp. 185-200.
Wagner, H., Lackkunstharz (Synthetic Resins for Paints), Carl Hanser Verlag, Munich (1971), pp. 86-152.
U. Meier-Westhues, Polyurethane—Paints—Lack, Klebund Dichtstoffe—Paints, Adhesive and Sealants, Hanover, Vincentz Network 2007, p. 50.
Ullmann's encyclopaedia of Industrial Chemistry, 4th Edition, vol. 19, Verlag Chemie, Weinheim, pp. 31-38.

* cited by examiner

*Primary Examiner* — Jessica Whiteley
(74) *Attorney, Agent, or Firm* — Richard P. Bender; John E. Mrozinski, Jr.

(57) ABSTRACT

The invention relates to a crystallization stable polyester prepolymers for producing HDI- and PDI-based, solvent free two component (2K)-polyurethane- and/or polyurea coating agents.

15 Claims, No Drawings

CRYSTALLIZATION STABLE POLYESTER PREPOLYMERS

CROSS-REFERENCE TO RELATED APPLICATIONS

This application is a National Phase Application of PCT/EP2016/050813, filed Jan. 15, 2016, which claims priority to European Application No. EP15151867.7, filed Jan. 20, 2015 each of which are incorporated herein by reference.

BACKGROUND OF THE INVENTION

Solvent-free two-component (2K) polyurethane or polyurea coating compositions, by contrast with solventborne paints, can be applied in coating thicknesses virtually as high as desired. They are used nowadays essentially in the construction sector for production of thick-build coatings, for example for coating of mechanically or chemically highly stressed areas, for example industrial floors, traffic areas, parking decks, for balcony sealing, or else in corrosion protection.

For outdoor applications, there is particular interest here in highly elastic crack-bridging coatings which have high stability to weathering stress, especially with respect to UV radiation.

Solvent-free 2K coatings necessarily require liquid co-reactants of low viscosity. While a number of suitable polyols and polyamines having sufficiently low viscosity, for example polyether polyols, lightly branched polyester polyols, polyether amines or polyaspartic esters are available, crosslinker components used for production of elastic coatings are preferably oligomeric polyisocyanates based on linear aliphatic diisocyanates, especially polyisocyanates of hexamethylene diisocyanate (1,6-diisocyanatohexane, (HDI)).

HDI polyisocyanates, such as the derivatives of HDI having uretdione, isocyanurate, allophanate, biuret, iminooxadiazinedione and/or oxadiazinetrione structure, which are known as paint polyisocyanates, even in solvent-free form, feature low viscosities and, as is well known, afford flexible paint films of high weathering resistance.

However, the maximum elasticity achievable with these oligomeric paint polyisocyanates is insufficient for production of crack-bridging coatings. There is reliance here on the use of linear or lightly branched isocyanate-functional prepolymers (NCO prepolymers) as crosslinker components.

Liquid low-monomer HDI prepolymers are known in principle. WO 2004/033517 describes, for example, NCO prepolymers prepared by reaction of polyisocyanates or diisocyanates, for example HDI, with polyether polyols, as co-reactants for polyaspartic esters for production of elastic coatings. Polyether prepolymers generally have very low viscosities, but are only of limited suitability because of their poor weathering resistance—a consequence of oxidative polyether chain degradation—for outdoor applications (U. Meier-Westhues, Polyurethane—Lacke, Kleb- and Dichtstoffe [Polyurethanes—Paints, Adhesives and Sealants], Hanover: Vincentz Network 2007, p. 50).

NCO prepolymers based on aromatics-free polyester polyols, by contrast, lead to coatings having good weathering stability and high gloss. This applies both to prepolymers based on polyester polyols that have been prepared by polycondensation of aliphatic di- and polycarboxylic acids or the anhydrides thereof with excess amounts of polyfunctional alcohols and to polycaprolactone polyols that have been obtained by ring-opening condensation of ε-caprolactone.

However, the polyester prepolymers of HDI known to date also have disadvantages. While those that have been prepared using condensation products of linear dicarboxylic acids have considerably higher viscosities than comparable polyether prepolymers or are even solid at room temperature, polycaprolactone polyester prepolymers of HDI exhibit comparatively low viscosities but also a strong tendency to crystallize, which leads to a rapid increase in haze and solidification especially under cool ambient conditions.

Isocyanate-functional HDI polyester prepolymers which fulfill all practical requirements, especially a sufficiently low viscosity for manual processing coupled with a simultaneously low tendency to crystallize, and which lead to elastic coatings of high mechanical durability are unknown to date.

SUMMARY OF THE INVENTION

The present invention provides novel isocyanate-functional polyester prepolymers that are not afflicted by the disadvantages of the art. These novel NCO prepolymers do not exhibit any tendency to turn hazy or crystallize even at low temperatures, have sufficiently low viscosities to be processable in a solvent-free manner, and cure rapidly under a wide variety of different ambient conditions to give elastic-, light- and weathering-resistant coatings.

DETAILED DESCRIPTION OF THE INVENTION

The present invention will now be described for purposes of illustration and not limitation.

Any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicants reserve the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112(a), and 35 U.S.C. § 132(a). The various embodiments disclosed and described in this specification can comprise, consist of, or consist essentially of the features and characteristics as variously described herein.

The present invention provides isocyanate-functional 1,6-diisocyanatohexane (HDI) polyester prepolymers and a process for the preparation thereof.

The present invention is based on the surprising observation that tightly defined mixtures of polycaprolactone polyesters and polyester polyols formed from aliphatic dicarboxylic acids and specific branched aliphatic diols can be reacted with HDI and also with pentamethylene diisocyanate (1,5-diisocyanatopentane, PDI) to give isocyanate-functional prepolymers which are entirely crystallization-stable at temperatures above 5° C. and at the same time feature exceptionally low viscosities.

The term "branched diols" in the context of the present invention is understood to mean diols of the general formula

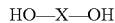

in which X is a branched alkyl or alkenyl radical having 3 to 36 carbon atoms.

Although EP-A 1 499 653, WO 03/106527 or US 2002/0077444 for example, mention diisocyanates, for example HDI, and, among other polyols, also polyester polyols formed from dicarboxylic acids or polycaprolactone polyesters as suitable formation components for low-monomer NCO prepolymers, none of these publications contains a specific reference to the combination of ε-caprolactone polyesters and polyester polyols based on branched aliphatic diols which is particularly advantageous in accordance with the invention for production of particularly low-viscosity, crystallization-stable polyester prepolymers.

The present invention provides prepolymers having isocyanate groups and having an NCO content of 2.8% to 18.0% by weight, a mean isocyanate functionality of 1.9 to 3.0 and a viscosity, measured to DIN EN ISO 3219, of max. 3000 mPas at 23° C., obtainable by reaction of 1,5-diisocyanatopentane and/or 1,6-diisocyanatohexane with A) at least one polyester polyol of mean functionality from 1.9 to 2.3 and of number-average molecular weight from 300 to 3000 g/mol, prepared from aliphatic dicarboxylic acids and/or anhydrides thereof with excess amounts of polyfunctional alcohols, where the polyfunctional alcohols are branched aliphatic diols to an extent of at least 30% by weight, based on the total amount of polyfunctional alcohols, and B) at least one polycaprolactone polyester of mean functionality from 2.0 to 3.0 and number-average molecular weight from 176 to 2000 g/mol, wherein the proportion of the polyester component A) in the total amount of polyester components A) and B) incorporated in the prepolymers is from 15% to 70% by weight.

The invention also provides a process for preparing such prepolymers having isocyanate groups and for the use thereof as starting components in the production of polyurethane plastics, especially as crosslinker components or as a constituent of crosslinker components for polyols and/or polyamines in two-component polyurethane and/or polyurea paints and coatings.

In the preparation of the isocyanate-functional prepolymers of the invention are as starting diisocyanates, PDI and/or HDI, which can be obtained by any desired processes, for example by phosgenation in the liquid phase or gas phase or by a phosgene-free route, for example by urethane cleavage.

According to the invention, these starting diisocyanates are reacted with two different polyester polyol components A) and B).

Polyester component A) comprises at least one polyester polyol which has been prepared by polycondensation of aliphatic dicarboxylic acids and/or anhydrides thereof with excess amounts of polyfunctional alcohols and has a mean OH functionality of 1.9 to 2.3, preferably of 1.9 to 2.1, more preferably of 2.0, and a number-average molecular weight of 300 to 3000 g/mol, preferably of 350 to 2000 g/mol, more preferably of 40 to 1000 g/mol, where the polyfunctional alcohols are branched aliphatic diols to an extent of at least 30% by weight, based on the total amount of polyfunctional alcohols used.

Polyester polyols of this kind are known. They are prepared in a manner known per se by methods as described, for example, in "Ullmanns Encyclopädie der Technischen Chemie" [Ullmann's Encyclopedia of Industrial Chemistry], Verlag Chemie Weinheim, 4th edition (1980), volume 19, pages 61ff. or by H. Wagner and H. F. Sarx in "Lackkunstharze" [Synthetic Paint Resins], Carl Hanser Verlag, Munich (1971), pages 86 to 152. If necessary, catalytic amounts of standard esterification catalysts, for example acids, bases or transition metal compounds, for example titanium tetrabutoxide, may be used. The esterification reaction is generally conducted within a temperature range from about 80 to 260° C., preferably from 100 to 230° C., until the desired values for the hydroxyl and acid numbers have been attained.

Starting compounds for preparation of the polyester polyols A) for use in accordance with the invention are any desired linear aliphatic or cycloaliphatic, saturated or unsaturated dicarboxylic acids or the anhydrides thereof having 4 to 12 carbon atoms, preferably having 4 to 6 carbon atoms, and polyhydric aliphatic or cycloaliphatic alcohols, preferably diols and triols, having 2 to 18 carbon atoms, preferably 2 to 6 carbon atoms.

Suitable dicarboxylic acids or anhydrides for preparation of the polyester polyols A) are, for example, succinic acid, succinic anhydride, glutaric acid, adipic acid, pimelic acid, suberic acid, azelaic acid, sebacic acid, decanedicarboxylic acid, maleic acid, maleic anhydride, fumaric acid, itaconic acid, itaconic anhydride, hexahydrophthalic acid, hexahydrophthalic anhydride, tetrahydrophthalic acid and tetrahydrophthalic anhydride, which can be used either individually or in the form of any desired mixtures with one another.

Suitable polyfunctional alcohols for preparation of the polyester polyols A) are, for example, ethane-1,2-diol, propane-1,3-diol, butane-1,4-diol, pentane-1,5-diol, hexane-1,6-diol, heptane-1,7-diol, octane-1,8-diol, nonane-1,9-diol, decane-1,10-diol, dodecane-1,12-diol, cyclohexane-1,2- and -1,4-diol, cyclohexane-1,4-dimethanol, 4,4'-(1-methylethylidene)biscyclohexanol, propane-1,2,3-triol (glycerol), 1,1,1-trimethylolethane, hexane-1,2,6-triol, 1,1,1-trimethylolpropane, 2,2-bis(hydroxymethyl)propane-1,3-diol, low molecular weight polyether diols, for example diethylene glycol and dipropylene glycol, and branched aliphatic diols, for example propane-1,2-diol, butane-1,3-diol, 2-methylpropanediol, 2,2-dimethyl-1,3-propanediol (neopentyl glycol), hexane-1,2-diol, 2-methylpentane-2,4-diol, 3-methylpentane-1,5-diol, 2-ethylhexane-1,3-diol, octane-1,2-diol, 2,2,4-trimethylpentane-1,5-diol, 2-butyl-2-ethylpropane-1,3-diol, 2,2,4- and/or 2,4,4-trimethylhexanediol, decane-1,2-diol or any desired mixtures of such alcohols. According to the invention, the polyfunctional alcohols are branched aliphatic diols of the type mentioned to an extent of at least 30% by weight, preferably at least 35% by weight, more preferably at least 40% by weight, based on the total amount of polyfunctional alcohols used.

Preferred polyester polyols A) are those based on succinic acid and/or adipic acid, ethane-1,2-diol, butane-1,4-diol, hexane-1,6-diol, glycerol, 1,1,1-trimethylolpropane, and the branched aliphatic diols butane-1,3-diol, neopentyl glycol, 2-butyl-2-ethylpropane-1,3-diol, 2,2,4-trimethylpentane-1,5-diol and 2,2,4- and/or 2,4,4-trimethylhexanediol as alcoholic formation components, where the proportion of branched aliphatic diols in the total amount of polyfunctional alcohols used corresponds to the figures given above.

Polyester component B) consists of at least one polyester polyol of mean functionality from 2.0 to 3.0, preferably from 2.0 to 2.5, more preferably 2.0, and of number-average molecular weight from 176 to 2200 g/mol, preferably from 200 to 2000 g/mol, more preferably from 230 to 1600 g/mol, as obtainable in a manner known per se from ε-caprolactone and simple polyhydric alcohols as starter molecules with ring opening.

Starter molecules used for the ring-opening polymerization may, for example, be di- or trifunctional alcohols mentioned above by way of example as suitable starting compounds for preparation of the polyester polyols A), or any desired mixtures of these alcohols.

The preparation of the ε-caprolactone polyester polyols B) by ring-opening polymerization is generally effected in the presence of catalysts, for example Lewis or Brønsted acids, organic tin or titanium compounds, at temperatures of 20 to 200° C., preferably 50 to 200° C.

Preferred polyester polyols B) are those which have been prepared using butane-1,4-diol, diethylene glycol, neopentyl glycol, hexane-1,6-diol, glycerol and/or 1,1,1-trimethylolpropane as starter molecule.

For performance of the process of the invention, the starting diisocyanates PDI and/or HDI are preferably reacted with the polyester polyols A) and B) at temperatures of 20 to 200° C., preferably 40 to 160° C., more preferably 60 to 140° C., observing an equivalents ratio of isocyanate groups to hydroxyl groups of from 4:1 to 200:1, preferably from 5:1 to 50:1, more preferably from 5:1 to 40:1.

The process of the invention can be conducted without catalysis. If necessary, however, suitable catalysts can also be used to accelerate the urethanization reaction. These are the conventional catalysts known from polyurethane chemistry, for example tertiary amines, for example triethylamine, tributylamine, dimethylbenzylamine, diethylbenzylamine, pyridine, methylpyridine, dicyclohexylmethylamine, dimethylcyclohexylamine, N,N,N',N'-tetramethyldiaminodiethyl ether, bis(dimethylaminopropyl)urea, N-methyl-/N-ethylmorpholine, N-cocomorpholine, N-cyclohexylmorpholine, N,N,N',N'-tetramethylethylenediamine, N,N,N',N'-tetramethyl-1,3-butanediamine, N,N,N',N'-tetramethyl-1,6-hexanediamine, pentamethyldiethylenetriamine, N-methylpiperidine, N-dimethylaminoethylpiperidine, N,N'-dimethylpiperazine, N-methyl-N-dimethylaminopiperazine, 1,8-diazabicyclo[5.4.0]undec-7-ene (DBU), 1,2-dimethylimidazole, 2-methylimidazole, N,N-dimethylimidazole-β-phenylethylamine, 1,4-diazabicyclo[2.2.2]octane, bis(N,N-dimethylaminoethyl) adipate; alkanolamine compounds, for example triethanolamine, triisopropanolamine, N-methyl- and N-ethyldiethanolamine, dimethylaminoethanol, 2-(N,N-dimethylaminoethoxy)ethanol, N,N',N''-tris(dialkylaminoalkyl)hexahydrotriazines, for example N,N',N''-tris(dimethylaminopropyl)-s-hexahydrotriazine and/or bis(dimethylaminoethyl) ether; metal salts, for example inorganic and/or organic compounds of iron, lead, bismuth, zinc and/or tin in customary oxidation states of the metal, for example iron(II) chloride, iron(III) chloride, bismuth(III) bismuth(III) 2-ethylhexanoate, bismuth(III) octoate, bismuth(III) neodecanoate, zinc chloride, zinc 2-ethylcaproate, tin(II) octoate, tin(II) ethylcaproate, tin(II) palmitate, dibutyltin(IV) dilaurate (DBTL), dibutyltin(IV) dichloride or lead octoate; amidines, for example 2,3-dimethyl-3,4,5,6-tetrahydropyrimidine; tetraalkylammonium hydroxides, for example tetramethylammonium hydroxide; alkali metal hydroxides, for example sodium hydroxide, and alkali metal alkoxides, for example sodium methoxide and potassium isopropoxide, and also alkali metal salts of long-chain fatty acids having 10 to 20 carbon atoms and optionally lateral OH groups.

These catalysts are used in the process of the invention, if at all, preferably in an amount of 0.001% to 5% by weight, more preferably 0.005% to 1% by weight, based on the total weight of all co-reactants, and may be added either before the beginning of the reaction or at any time during the reaction.

The process of the invention is preferably conducted without solvent. If desired, however, suitable solvents inert toward the reactive groups of the starting components can also be used. Suitable solvents are, for example, the customary paint solvents that are known per se such as ethyl acetate, butyl acetate, ethylene glycol monomethyl or monoethyl ether acetate, 1-methoxyprop-2-yl acetate, 3-methoxy-n-butyl acetate, acetone, 2-butanone, 4-methyl-2-pentanone, cyclohexanone, toluene, xylene, chlorobenzene, white spirit, more highly substituted aromatics, of the kind available commercially, for example, under the names SOLVENT-NAPHTHA, SOLVESSO, ISOPAR, NAPPAR, VARSOL (ExxonMobil Chemical Central Europe, Cologne, Germany) and SHELLSOL (Shell Deutschland Oil GmbH, Hamburg, Germany), and also solvents such as propylene glycol diacetate, diethylene glycol dimethyl ether, dipropylene glycol dimethyl ether, diethylene glycol ethyl and butyl ether acetate, N-methylpyrrolidone and N-methylcaprolactam, or any desired mixtures of such solvents.

In one possible embodiment, in the process of the invention, the starting diisocyanate PDI and/or HDI is introduced, optionally under inert gas, such as nitrogen, for example, optionally in the presence of a catalyst of the type mentioned above and optionally in the presence of a suitable solvent of the stated type, at a temperature between 20 and 120° C. Subsequently, the polyol components A) and B) are added in the amount specified above as a mixture or successively in any sequence, and the reaction temperature for the urethanization is optionally adjusted by a suitable measure (heating or cooling) to a temperature of 20 to 200° C., preferably 40 to 160° C., more preferably 60 to 140° C.

The progress of the reaction in the process of the invention can be monitored by determining the NCO content by titrimetric means, for example. On attainment of the desired NCO content, preferably when the NCO content corresponding in theoretical terms to complete conversion of isocyanate and hydroxyl groups has been attained in the reaction mixture, any urethanization catalysts used are preferably deactivated by addition of suitable catalyst poisons.

Such catalyst poisons are, for example, inorganic acids such as hydrochloric acid, phosphorous acid or phosphoric acid, acid chlorides such as acetyl chloride, benzoyl chloride or isophthaloyl chloride, sulfonic acids and sulfonic esters, such as methanesulfonic acid, p-toluenesulfonic acid, trifluoromethanesulfonic acid, perfluorobutanesulfonic acid, dodecylbenzenesulfonic acid, methyl and ethyl p-toluenesulfonate, mono- and dialkyl phosphates such as monotridecyl phosphate, dibutyl phosphate and dioctyl phosphate, but also silylated acids such as trimethylsilyl methanesulfonate, trimethylsilyl trifluoromethanesulfonate, tris(trimethylsilyl) phosphate and diethyl trimethylsilyl phosphate.

The amount of catalyst poison required for deactivation of the catalyst is guided by the amount of the catalyst used. In general, an equivalent amount of the catalyst poison is used, based on the urethanization catalyst used at the start. If, however, any catalyst losses that occur during the reaction are taken into account, even 20 to 80 equivalent % of the catalyst poison, based on the amount of catalyst originally used, may be sufficient to stop the reaction.

After any catalyst deactivation required, the reaction mixture is preferably freed of volatile constituents (excess monomeric diisocyanates, any solvents used, and, when no catalyst poison is being used, any active catalyst) by thin-film distillation under a high vacuum, for example at a pressure below 1.0 mbar, preferably below 0.5 mbar, more preferably below 0.2 mbar, under very gentle conditions, as for example at a temperature of 100 to 200° C., preferably of 120 to 180° C.

The distillates obtained, which, as well as the unconverted monomeric starting diisocyanates, comprise any solvents used, and where no catalyst poison is used any active catalyst, can be used readily for another prepolymerization.

In another possible embodiment of the process of the invention, the starting diisocyanates are not reacted with a mixture of the two polyester polyols A) and B), but with the respective individual components A) and B) in two separate reactions, under the aforementioned reaction conditions. In this mode of performance of the process of the invention, the actual preparation of the prepolymers of the invention is effected by simple blending of the prepolymers obtained with exclusive use of polyester polyols A) and with exclusive use of polyester polyols B) after they have been synthesized.

The present invention therefore also provides a process for preparing prepolymers having isocyanate groups and having an NCO content of 2.8% to 18.0% by weight, a mean isocyanate functionality of 1.9 to 3.0 and a viscosity, measured to DIN EN ISO 3219, of max. 3000 mPas at 23° C., characterized in that 1,5-diisocyanatopentane and/or 1,6-diisocyanatohexane are reacted in separate reactions with
   A) at least one polyester polyol of mean functionality from 1.9 to 2.3 and of number-average molecular weight from 300 to 3000 g/mol, prepared from aliphatic dicarboxylic acids and/or anhydrides thereof with excess amounts of polyfunctional alcohols, where the polyfunctional alcohols are branched aliphatic diols to an extent of at least 30% by weight, based on the total amount of polyfunctional alcohols, and
   B) at least one polycaprolactone polyester of mean functionality from 2.0 to 3.0 and number-average molecular weight from 176 to 2000 g/mol, at temperatures of 20 to 200° C., observing an equivalents ratio of isocyanate groups to hydroxyl groups of 4:1 to 200:1, and the prepolymers thus obtained are blended with one another in such a way that the proportion of the polyester component A) in the total amount of the polyester components A) and B) converted is from 15% to 70% by weight.

In another possible embodiment of the process of the invention, the starting diisocyanates are reacted in multiple individual reactions with mixtures of the two polyester polyols A) and B) under the aforementioned reaction conditions, but the co-reactants are present in such ratios that, based on the above-defined minimum amount of branched diols in polyester component A) and/or the proportion of component A) in the total amount of the polyester components A) and B), no prepolymers of the invention are obtained at first. The actual preparation of prepolymers of the invention, in this mode of performance of the process of the invention, is effected by blending these noninventive prepolymers with one another or else with noninventive prepolymers which have been prepared with exclusive use of polyester polyols A) and/or with exclusive use of polyester polyols B), in such amounts as to result in prepolymers that satisfy the abovementioned characteristics.

The present invention therefore also provides a process for preparing prepolymers having isocyanate groups and having an NCO content of 2.8% to 18.0% by weight, a mean isocyanate functionality of 1.9 to 3.0 and a viscosity, measured to DIN EN ISO 3219, of max. 3000 mPas at 23° C., characterized in that 1,5-diisocyanatopentane and/or 1,6-diisocyanatohexane are reacted in multiple individual reactions with mixtures of
   A) at least one polyester polyol of mean functionality from 1.9 to 2.3 and of number-average molecular weight from 300 to 3000 g/mol, prepared from aliphatic dicarboxylic acids and/or anhydrides thereof with excess amounts of polyfunctional alcohols, where the polyfunctional alcohols are branched aliphatic diols to an extent of at least 30% by weight, based on the total amount of polyfunctional alcohols, with
   B) at least one polycaprolactone polyester of mean functionality from 2.0 to 3.0 and number-average molecular weight from 176 to 2000 g/mol, at temperatures of 20 to 200° C., observing an equivalents ratio of isocyanate groups to hydroxyl groups of 4:1 to 200:1, and the prepolymers thus obtained are blended with one another in such a way that the proportion of the polyester component A) in the total amount of the polyester components A) and B) converted is from 15% to 70% by weight.

Finally, it is also possible to admix noninventive prepolymers of the type described above that are based on polyester components A) and/or B) with inventive prepolymers in such amounts that the mixtures still satisfy the above conditions formulated for inventive prepolymers.

The present invention therefore likewise provides a process for preparing prepolymers having isocyanate groups and having an NCO content of 2.8% to 18.0% by weight, a mean isocyanate functionality of 1.9 to 3.0 and a viscosity, measured to DIN EN ISO 3219, of max. 3000 mPas at 23° C., characterized in that 1,5-diisocyanatopentane and/or 1,6-diisocyanatohexane are reacted in separate reactions with
   i) a mixture/mixtures of
      A) at least one polyester polyol of mean functionality from 1.9 to 2.3 and of number-average molecular weight from 300 to 3000 g/mol, prepared from aliphatic dicarboxylic acids and/or anhydrides thereof with excess amounts of polyfunctional alcohols, where the polyfunctional alcohols are branched aliphatic diols to an extent of at least 30% by weight, based on the total amount of polyfunctional alcohols, with
      B) at least one polycaprolactone polyester of mean functionality from 2.0 to 3.0 and number-average molecular weight from 176 to 2000 g/mol,
   and
   ii) at least one polyester polyol according to A,
   and/or
   iii) at least one polyester polymer according to B,
at temperatures of 20 to 200° C., observing an equivalents ratio of isocyanate groups to hydroxyl groups of 4:1 to 200:1, and the prepolymers thus obtained are blended with one another in such a way that the proportion of the polyester component A) in the total amount of the polyester components A) and B) converted is from 15% to 70% by weight.

If the chosen process for preparing the prepolymers of the invention comprises a blending step as described above, this can be effected at any time either before or after the removal of volatile constituents, for example excess monomeric diisocyanates, from the reaction mixtures of individual prepolymers, for example by thin-film distillation.

Irrespective of the type of preparation process chosen—a direct preparation from a mixture of polyester components A) and B) or a preparation by blending of separately synthesized prepolymers—the amount of the starting materials used, especially of the polyester components A) and B), are chosen such that, in the resulting prepolymers of the invention, the proportion of the polyester component A), based on the total amount of the polyester components A) and B) used, is from 15% to 70% by weight, preferably from 20% to 65% by weight, more preferably from 25% to 60% by weight.

Irrespective of the mode of preparation thereof, the process products of the invention are clear, virtually colorless NCO prepolymers which generally have color numbers of below 120 APHA, preferably below 80 APHA, more preferably below 60 APHA, and an NCO content of 2.8% to 17.0% by weight, preferably 3.8% to 14.0% by weight, more preferably 6.0 to 13.0% by weight, and a mean NCO functionality of 1.9 to 3.0, preferably of 1.9 to 2.5, more preferably of 2.0 to 2.2, most preferably 2.0.

The NCO prepolymers of the invention, for polyester prepolymers, feature very low viscosities (to DIN EN ISO 3219) of not more than 3000 mPas at 23° C., preferably from 600 to 2500 mPas, more preferably from 1000 to 2000 mPas. At the same time, are entirely crystallization-stable and do not show a tendency at all to turn hazy or solidify even at low temperatures, for example at 5° C.

This combination of properties means that the process products of the invention are very particularly designed for outdoor applications, for example in the construction sector, in which sufficiently low viscosities and low crystallization tendency are required even at low ambient temperatures for manual processability.

The polyester prepolymers of the invention are valuable starting materials for production of polyurethane plastics, polythiourethane plastics and/or polyurea plastics by the isocyanate polyaddition method.

At the same time, they can be used without solvent, but as and when required may also be converted to a haze-free dilution form using customary solvents, examples being the aforementioned inert paint solvents for optional accompanying use in the process of the invention.

The prepolymers of the invention are outstandingly suitable as crosslinker components for two-component polyurethane coating materials, in which polyhydroxyl compounds present are the customary polyether polyols, polyester polyols, polycarbonate polyols and/or polyacrylate polyols, as co-reactants for the polyisocyanates. Co-reactants particularly preferred as polyols for the process products of the invention are polyacrylates containing hydroxyl groups, i.e., polymers and/or copolymers of (meth)acrylic acid alkyl esters, optionally with styrene or other copolymerizable olefinically unsaturated monomers.

In general, the coating compositions formulated with the prepolymers of the invention, into which compositions, optionally, the auxiliaries and additives customary in the coatings sector may be incorporated, examples being flow control assistants, color pigments, fillers or matting agents, have technical coatings properties that are good even in the case of room-temperature drying. Of course, they may alternatively be dried under forced conditions at elevated temperature or by baking at temperatures up to 260° C.

To control the speed of curing, it is possible to use suitable catalysts in the formulation of the coating compositions, for example the urethanization catalysts that are customary in isocyanate chemistry, as already described above, for example, as catalysts for preparation of the prepolymers of the invention.

The prepolymers of the invention can of course also be used in a form in which they are blocked with blocking agents known per se from polyurethane chemistry, in combination with the aforementioned film-forming binders or film-forming binder components, as one-component PU baking systems. Examples of suitable blocking agents are diethyl malonate, ethyl acetoacetate, activated cyclic ketones, such as cyclopentanone-2-carboxymethyl ester and -carboxyethyl ester, for example, acetone oxime, butanone oxime, ε-caprolactam, 3,5-dimethylpyrazole, 1,2,4-triazole, dimethyl-1,2,4-triazole, imidazole, benzyl-tert-butylamine, or any desired mixtures of these blocking agents.

The polyester prepolymers of the invention can particularly advantageously also be combined with polyamines, such as the polyaspartic acid derivatives known from EP-B 0 403 921, or else with polyamines whose amino groups are in blocked form, such as polyketimines, polyaldimines or oxazolanes, for example. The effect of moisture on these blocked amino groups is to turn them into free amino groups and, in the case of the oxazolanes, into free hydroxyl groups as well, which are consumed by crosslinking reaction with the prepolymers.

For production of coatings or moldings of particularly high refraction, the thioallophanate polyisocyanates of the invention can also be reacted with any desired polythiols, especially polythioether thiols and polyester thiols, for example 4-mercaptomethyl-1,8-dimercapto-3,6-dithiaoctane, 2,5-bismercaptomethyl-1,4-dithiane, 1,1,3,3-tetrakis (mercaptomethylthio)propane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, trimethylolpropane tris(3-mercaptopropionate), trimethylolethane tris(2-mercaptoacetate), pentaerythritol tetrakis(2-mercaptoacetate) and pentaerythritol tetrakis(3-mercaptopropionate), to give polythiourethanes.

In all the uses described above for the prepolymers of the invention, they may be used either alone or, for example to increase the crosslinking density, in blends with any desired further polyisocyanates having aliphatically, cycloaliphatically, araliphatically and/or aromatically bonded isocyanate groups, more particularly with the known paint polyisocyanates having uretdione, isocyanurate, iminooxadiazindione, urethane, allophanate, biuret and/or oxadiazinetrione structure, as described by way of example in Laas et al., J. Prakt. Chem. 336, 1994, 185-200, DE-A 1 670 666, DE-A 3 700 209, DE-A 3 900 053, EP-A 0 330 966, EP-A 0 336 205, EP-A 0 339 396 and EP-A 0 798 299, as isocyanate component.

In two-component polyurethane and/or polyurea paints and coatings which comprise the prepolymers of the invention as crosslinker components or constituents of crosslinker components for polyols, polythiols and/or polyamines, the co-reactants are customarily present in amounts such that for every optionally blocked isocyanate group there are 0.5 to 3, preferably 0.6 to 2.0, more preferably 0.8 to 1.6 optionally blocked, isocyanate-reactive groups.

Substrates contemplated for the coatings formulated using the prepolymers of the invention include any desired substrates, such as, for example, metal, wood, glass, stone, ceramic materials, concrete, rigid and flexible plastics, textiles, leather, and paper, which prior to coating may optionally also be provided with customary primers.

This invention therefore further provides coating compositions comprising the prepolymers of the invention, and the substrates coated with these coating compositions.

EXAMPLES

All percentages are based on weight, unless stated otherwise.

The NCO contents were determined by titrimetry as per DIN EN ISO 11909. The residual monomer contents were measured to DIN EN ISO 10283 by gas chromatography with an internal standard.

All the viscosity measurements were made with a Physica MCR 51 rheometer from Anton Paar Germany GmbH (Germany) to DIN EN ISO 3219.

The percentage of branched aliphatic diols reported for the starting polyesters A) is based in each case on the total amount of the polyfunctional alcohols used in the polyester synthesis.

The number-average molecular weights reported for the starting polyesters A) and B) were each calculated from OH number and OH functionality.

The percentages of polyester component A) reported for the process products of the invention are each based on the total amount of polyester components A) and B) used.

The dry-hard times were determined with the aid of a Gardner circular drying time recorder in accordance with DIN EN ISO 9117-4.

The glass transition temperature Tg was determined by means of DSC (differential scanning calorimetry) with a Mettler DSC 12E (Mettler Toledo GmbH, Giessen, Germany) at a heating rate of 10° C./min Shore hardnesses were measured to DIN 53505 with the aid of a Zwick 3100 Shore hardness tester (from Zwick, Germany).

The tear propagation resistance of the coatings obtained was determined on the free films in accordance with DIN ISO 34-1. Free films were likewise used to determine elongation at break and breaking stress in accordance with DIN EN ISO 527-1.

Starting Compounds

Polyester Polyol A1)

17.2 parts by weight of neopentyl glycol, 13.3 parts by weight of butane-1,4-diol, 17.5 parts by weight of hexane-1,6-diol, 4.4 parts by weight of 2,2,4-trimethylpentane-1,3-diol, 4.4 parts by weight of 2-butyl-2-ethylpropane-1,3-diol and 43.2 parts by weight of adipic acid were weighed into a flask and, in the presence of 25 ppm of tin(II) chloride as catalyst, heated gradually to 200° C. at standard pressure while stirring, in the course of which about 5 parts by weight of water distilled off. After the elimination of water had ended, over the course of about 4 hours, a vacuum (15 mbar) was gradually applied and the reaction was completed under these conditions within about a further 15 hours. The polyester polyol obtained in this way had the following characteristic data:

| | |
|---|---|
| OH number: | 260 mg KOH/g |
| Acid number: | 0.2 mg KOH/g |
| OH functionality: | 2.0 |
| Average molecular weight: | 431 g/mol |
| Viscosity (25° C.): | 810 mPas |
| Proportion of branched diols: | 56.8% |

Polyester Polyol A2)

53.5 parts by weight of neopentyl glycol, 1.1 parts by weight of ethane-1,2-diol and 45.4 parts by weight of adipic acid were used to prepare, by the process described for A1), a polyester polyol having the following characteristic data:

| | |
|---|---|
| OH number: | 227 mg KOH/g |
| Acid number: | 1.4 mg KOH/g |
| OH functionality: | 2.0 |
| Average molecular weight: | 495 g/mol |
| Viscosity (25° C.): | 2600 mPas |
| Proportion of branched diols: | 98.0% |

Polyester Polyol A3)

17.4 parts by weight of neopentyl glycol, 29.9 parts by weight of hexane-1,6-diol and 52.7 parts by weight of adipic acid were used to prepare, by the process described for A1), a polyester polyol having the following characteristic data:

| | |
|---|---|
| OH number: | 56 mg KOH/g |
| Acid number: | 0.8 mg KOH/g |
| OH functionality: | 2.0 |
| Average molecular weight: | 2000 g/mol |
| Viscosity (25° C.): | 3200 mPas |
| Proportion of branched diols: | 36.8% |

Polyester Polyol A4)

16.1 parts by weight of neopentyl glycol, 12.5 parts by weight of butane-1,4-diol, 4.1 parts by weight of 2,2,4-trimethylpentane-1,3-diol, 4.1 parts by weight of 2-butyl-2-ethylpropane-1,3-diol, 16.4 parts by weight of hexane-1,6-diol, 6.3 parts by weight of 1,1,1-trimethylolpropane and 40.5 parts by weight of adipic acid were used to prepare, by the process described for A1), a polyester polyol having the following characteristic data:

| | |
|---|---|
| OH number: | 327 mg KOH/g |
| Acid number: | 2.2 mg KOH/g |
| OH functionality: | 2.2 |
| Average molecular weight: | 377 g/mol |
| Viscosity (25° C.): | 970 mPas |
| Proportion of branched diols: | 40.8% |

Polyester Polyol A5) (Noninventive)

36.6 parts by weight of ethane-1,2-diol and 63.4 parts by weight of adipic acid were used to prepare, by the process described for A1), a polyester polyol having the following characteristic data:

| | |
|---|---|
| OH number: | 179 mg KOH/g |
| Acid number: | 0.6 mg KOH/g |
| OH functionality: | 2.0 |
| Average molecular weight: | 625 g/mol |
| Melting range: | 27-31° C. |
| Viscosity (50° C.): | 320 mPas |
| Proportion of branched diols: | 0.0% |

Polyester Polyol A6) (Noninventive)

52.1 parts by weight of hexane-1,6-diol and 47.9 parts by weight of adipic acid were used to prepare, by the process described for A1), a polyester polyol having the following characteristic data:

| | |
|---|---|
| OH number: | 134 mg KOH/g |
| Acid number: | 0.8 mg KOH/g |
| OH functionality: | 2.0 |
| Average molecular weight: | 835 g/mol |
| Melting range: | 35-45° C. |
| Viscosity (50° C.): | 450 mPas |
| Proportion of branched diols: | 0.0% |

Polyester Polyol B1)
Hexane-1,6-diol-started ε-caprolactone polyester

| | |
|---|---|
| OH number: | 172 mg KOH/g |
| OH functionality: | 2.0 |
| Average molecular weight: | 650 g/mol |
| Melting range: | 20-30° C. |
| Viscosity (50° C.): | 80 mPas |

Polyester Polyol B2)
ε-Caprolactone polyester started from a mixture of 60 parts by weight of diethylene glycol and 40 parts by weight of glycerol

| | |
|---|---|
| OH number: | 560 mg KOH/g |
| OH functionality: | 2.4 |
| Average molecular weight: | 240 g/mol |
| Melting range: | 0-10° C. |
| Viscosity (50° C.): | 40 mPas |

Polyester Polyol B3)
Neopentyl glycol-started ε-caprolactone polyester

| | |
|---|---|
| OH number: | 70 mg KOH/g |
| OH functionality: | 2.0 |
| Average molecular weight: | 1600 g/mol |
| Melting range: | 35-50° C. |
| Viscosity (50° C.): | 300 mPas |

Example 1 (Inventive)

1260 g (7.5 mol) of hexamethylene diisocyanate (HDI) were introduced under dry nitrogen with stirring at a temperature of 100° C. and a mixture of 142 g (0.33 mol) of polyester polyol A1) and 110 g (0.17 mol) of polyester polyol B1) were added over the course of 90 minutes. After the addition had ended, the reaction mixture was stirred further at 110° C. until, after about 3 hours, the NCO content of 38.9%, corresponding to complete urethanization, had been attained.

The unconverted monomeric HDI was removed on a thin-film evaporator at a temperature of 130° C. and a pressure of 0.1 mbar. This gave 390 g of a colorless clear prepolymer which had the following characteristics and composition:

| | |
|---|---|
| NCO content: | 9.1% |
| Monomeric HDI: | 0.08% |
| Viscosity (23° C.): | 1920 mPas |
| Average NCO functionality (calc.): | 2.0 |
| Fractions of polyester A): | 56.3% |

Example 2 (Noninventive, Comparison)

By the process described in Example 1, 1260 g (7.5 mol) of HDI were reacted with 215 g (0.5 mol) of polyester polyol A1). After attainment of an NCO content of 39.8%, unconverted HDI was removed in the thin-film evaporator. This gave 382 g of a colorless clear prepolymer which had the following characteristics:

| | |
|---|---|
| NCO content: | 10.3% |
| Monomeric HDI: | 0.07% |
| Viscosity (23° C.): | 3840 mPas |
| Average NCO functionality (calc.): | 2.0 |
| Fractions of polyester A): | 100% |

The example shows that, with the exclusive use of a polyester polyol A1), a fluid clear HDI prepolymer is obtained, but one which has too high a viscosity for problem-free manual processing.

Example 3 (Noninventive, Comparison)

By the process described in Example 1, 1260 g (7.5 mol) of HDI were reacted with 325 g (0.5 mol) of polyester polyol B1). After attainment of an NCO content of 37.1%, unconverted HDI was removed in the thin-film evaporator. This gave 480 g of a colorless, initially clear prepolymer, but one which turned hazy and solidified after a few hours at room temperature. The semicrystalline product had the following characteristic data:

| | |
|---|---|
| NCO content: | 8.1% |
| Monomeric HDI: | 0.08% |
| Viscosity (23° C.): | n.d. |
| Average NCO functionality (calc.): | 2.0 |
| Fractions of polyester A): | 0% |

Example 4 (Inventive)

270 g (0.33 mol) of the prepolymer from Example 2 were introduced together with 175 g (0.17 mol) of the prepolymer from Example 3 under dry nitrogen, and homogenized by stirring at a temperature of 50° C. for one hour. This gave 445 g of a colorless clear prepolymer mixture which had the following characteristics:

| | |
|---|---|
| NCO content: | 9.4% |
| Monomeric HDI: | 0.07% |
| Viscosity (23° C.): | 1850 mPas |
| Average NCO functionality (calc.): | 2.0 |
| Fractions of polyester A): | 56.8% |

To examine the low-temperature stability, the low-viscosity clear polyester prepolymers from Examples 1 and 4 were stored in a refrigerator at a temperature of 5° C. for one week. By contrast with the prepolymer from Example 3, which turned hazy even at room temperature, the samples stored under cool conditions remained entirely clear and transparent.

Examples 5 to 14 (Inventive and Comparison)

By the process described in Example 1, HDI prepolymers were prepared using different polyester components A) and/or B). Table 1 shows the amounts of the co-reactants used in each case, and characteristics and properties of the products obtained.

The low-temperature stability was tested, as described in example 4, by storage in a refrigerator at a temperature of 5° C. for one week, followed by visual assessment.

Examples 10C, 12C, 13C and 14C were comparative examples.

TABLE 1

| Example | 5 | 6 | 7 | 8 | 9 | 10 C | 11 | 12 C | 13 C | 14 C |
|---|---|---|---|---|---|---|---|---|---|---|
| HDI | 1260 | 1260 | 1260 | 1260 | 1210 | 1330 | 1260 | 1260 | 1260 | 1260 |
| Polyester polyol A1) | — | — | — | — | — | — | 165 | 175 | — | — |
| Polyester polyol A2) | 89 | 189 | — | — | — | — | — | — | — | — |
| Polyester polyol A3) | — | — | — | — | 21 | 18 | — | — | — | — |
| Polyester polyol A4) | — | — | 82 | 144 | — | — | — | — | — | — |
| Polyester polyol A5) | — | — | — | — | — | — | — | — | 120 | — |
| Polyester polyol A6) | — | — | — | — | — | — | — | — | — | 100 |
| Polyester polyol B1) | 208 | — | 168 | — | — | — | 77 | 60 | 200 | 247 |
| Polyester polyol B2) | — | — | — | — | 118 | 130 | — | — | — | — |
| Polyester polyol B3) | — | 189 | — | 124 | — | — | — | — | — | — |
| NCO:OH [eq] | 15:1 | 15:1 | 15:1 | 15:1 | 12:1 | 12:1 | 15:1 | 15:1 | 15:1 | 15:1 |
| NCO content [%] | 8.5 | 7.3 | 9.6 | 9.0 | 12.4 | 12.3 | 9.6 | 9.8 | 8.2 | 7.9 |
| Monomeric HDI [%] | 0.05 | 0.07 | 0.11 | 0.08 | 0.07 | 0.12 | 0.05 | 0.06 | 0.07 | 0.10 |
| NCO functionality (calc.): | 2.0 | 2.0 | 2.3 | 2.3 | 2.5 | 2.5 | 2.0 | 2.0 | 2.0 | 2.0 |
| Viscosity [mPas/23° C.]: | 2540 | 2760 | 1850 | 2880 | 2620 | 2400 | 2870 | 3280 | 5780 | 5450 |
| Fractions of polyester A) [%] | 30.0 | 50.0 | 32.8 | 53.7 | 15.1 | 12.2 | 68.2 | 74.4 | 37.5 | 28.8 |
| Low-temperature storage [1] | OK | OK | OK | OK | OK | hazy | OK | OK | hazy | hazy |

Example 15 (Inventive)

150 g (0.22 mol) of the noninventive prepolymer from Example 10 were introduced together with 350 g (0.41 mol) of the noninventive prepolymer from example 12 under dry nitrogen, and homogenized by stirring at a temperature of 50° C. for one hour. This gave 500 g of a colorless clear prepolymer mixture which had the following characteristics:

| | |
|---|---|
| NCO content: | 10.5% |
| Monomeric HDI: | 0.09% |
| Viscosity (23° C.): | 2780 mPas |
| Average NCO functionality (calc.): | 2.0 |
| Fractions of polyester A): | 55.7% |

To examine the low-temperature stability, the product was stored in a refrigerator at a temperature of 5° C. for one week. The sample did not show any haziness, but remained entirely clear and transparent.

Example 16 (Inventive)

400 g (0.40 mol) of the inventive prepolymer from Example 5 were introduced together with 100 g (0.10 mol) of the noninventive prepolymer from Example 13 under dry nitrogen, and homogenized by stirring at a temperature of 50° C. for one hour. This gave 500 g of a colorless clear prepolymer mixture which had the following characteristics:

| | |
|---|---|
| NCO content: | 8.4% |
| Monomeric HDI: | 0.06% |
| Viscosity (23° C.): | 2920 mPas |
| Average NCO functionality (calc.): | 2.0 |
| Fractions of polyester A): | 31.5% |
| Fraction of branched diols: | 83.9% |

To examine the low-temperature stability, the product was stored in a refrigerator at a temperature of 5° C. for one week. The sample did not show any haziness, but remained entirely clear and transparent.

Example 17 (Inventive)

By the process described in Example 1, 1155 g (7.5 mol) of 1,5-diisocyanatopentane (PDI) were reacted with a mixture of 142 g (0.33 mol) of polyester polyol A1) and 110 g (0.17 mol) of polyester B1), corresponding to an equivalents ratio of NCO:OH of 15:1. On attainment of an NCO content of 41.8%, unconverted PDI was removed in a thin-film evaporator at a temperature of 130° C. and a pressure of 0.1 mbar. This gave 405 g of a colorless clear prepolymer which had the following characteristics and composition:

| | |
|---|---|
| NCO content: | 9.9% |
| Monomeric PDI: | 0.05% |
| Viscosity (23° C.): | 2050 mPas |
| Average NCO functionality (calc.): | 2.0 |
| Fractions of polyester A): | 56.3% |

To examine the low-temperature stability, a sample of the PDI prepolymer thus obtained was stored in a refrigerator at a temperature of 5° C. for one week. The sample did not show any haziness, but remained entirely clear and transparent.

Example 18 (Use, Inventive and Comparative)

The following raw materials were used in the ratios specified to produce an amino-functional binder component by preliminary dispersion with the aid of a dissolver while cooling for 10 minutes:

| | |
|---|---|
| DESMOPHEN NH 1420[1] | 80.0 parts by weight |
| DESMOPHEN NH 2850 XP[2] | 20.0 parts by weight |
| SYLOSIV A4[3] | 2.0 parts by weight |
| TEGO AIREX 944[4] | 1.0 part by weight |
| TEGO WET 250[5] | 0.2 part by weight |

[1] polyaspartic ester, difunctional (supply form 100%, equivalent weight: 276 g/eq NH), Covestro AG, 51368 Leverkusen, Germany
[2] polyaspartic ester, difunctional (supply form 100%, equivalent weight: 290 g/eq NH), Covestro AG, 51368 Leverkusen, Germany
[3] Micronized crystalline aluminum silicate, molecular sieve, GRACE Davison, 67547 Worms, Germany
[4] Deaerator, Evonik Industries AG, 45127 Essen, Germany
[5] Wetting additive, Evonik Industries AG, 45127 Essen, Germany For production of a coating composition of the invention ready for processing, 139.5 parts by weight of a crosslinker mixture of the following composition were added to this binder component and incorporated thoroughly:

| | |
|---|---|
| Prepolymer from Example 1 | 80.0 parts by weight |
| DESMODUR N 3600[6] | 20.0 parts by weight |

[6]Low-viscosity HDI trimer (supply form 100%, NCO content: 23.0%, equivalent weight: 183 g/eq NCO, viscosity (23° C.): 1200 mPas), Covestro AG, 51368 Leverkusen, Germany For comparison, in a second paint batch of the same binder component, exclusively 72.0 parts by weight of the low-viscosity HDI trimer DESMODUR N 3600 were added and likewise incorporated thoroughly. In each of the two coating compositions, the equivalents ratio of isocyanate groups to amino groups was 1.1:1.

The two solvent-free paints that were formulated in this way, which had comparable pot lives of about 2 hours, were each applied to glass plates with a coating bar in a wet film layer thickness of about 400 μm and cured at room temperature (about 23° C.). Table 2 once again compares the compositions and paint-related properties of the two coatings.

Distinct differences were found in the mechanical properties of the two coatings. As shown by the results detailed in Table 2, the inventive coating composition produced using the prepolymer from Example 1 has considerably higher elasticities compared to a system crosslinked conventionally, i.e. exclusively with a low-viscosity polyisocyanate, and for that reason it is very particularly suitable for production of crack-bridging coatings.

TABLE 2

| Example 18 | | Inventive | Comparison |
|---|---|---|---|
| DESMOPHEN NH 1420 | [parts by wt.] | 80.0 | 80.0 |
| DESMOPHEN NH 2850 XP | [parts by wt.] | 20.0 | 20.0 |
| Prepolymer from Example 1 | [parts by wt.] | 111.6 | — |
| DESMODUR N 3600 | [parts by wt.] | 27.9 | 72.1 |
| SYLOSIV A4 | [parts by wt.] | 2.0 | 2.0 |
| TEGO AIREX 944 | [parts by wt.] | 1.0 | 1.0 |
| TEGO WET 250 | [parts by wt.] | 0.2 | 0.2 |
| Processing time [h:min] | | 1:35 | 0:45 |
| Gardner dry-hard time [h:min] | | 3:40 | 2:10 |
| Shore A/D after 3 days at 23° C. | | 45/<20 | —/69 |
| after 14 days at 23° C. | | 51/<20 | —/72 |
| after 3 days at 23° C. + 3 days at 50° C. | | 45/<20 | —/70 |
| Tg [° C.] | 1st heating | 15.5 | 54.2 |
| | 2nd heating | 21.5 | 59.5 |
| | 3rd heating | 21.0 | 58.8 |
| Tear propagation resistance | [N/mm] | 11.6 | 8.5 |
| Nominal elongation at break | [%] | 329 | 103 |
| Breaking stress | [MPa] | 10.4 | 12.3 |

Example 19 (Use)

The following raw materials were used in the ratios specified to produce an amino-functional binder component by preliminary dispersion with the aid of a dissolver while cooling for 10 minutes:

| | |
|---|---|
| DESMOPHEN NH 1420[1] | 100.0 parts by weight |
| SYLOSIV A4[3] | 2.0 parts by weight |
| TEGO AIREX 944[4] | 1.0 part by weight |
| TEGO WET 250[5] | 0.2 part by weight |

[1]-[5]see Example 16

For production of a coating composition of the invention ready for processing, 152.2 parts by weight of a crosslinker mixture of the following composition were added to this binder component, corresponding to an NCO:NH equivalents ratio of 1.1:1, and incorporated thoroughly:

| | |
|---|---|
| Prepolymer from Example 1 | 85.0 parts by weight |
| DESMODUR N 3400[7] | 15.0 parts by weight |

[7]Low-viscosity HDI polyisocyanate containing uretdione groups (supply form 100%, NCO content: 21.8%, equivalent weight: 193 g/eq NCO, viscosity (23° C.): 175 mPas), Covestro AG, 51368 Leverkusen, Germany The solvent-free paint obtained in this way, which had a pot life of about 90 minutes, was applied to a glass plate with a coating bar in a wet film layer thickness of about 400 μm and cured at room temperature (about 23° C.). Table 3 shows the paint-related properties of the coatings.

TABLE 3

| | | |
|---|---|---|
| Gardner dry-hard time [h:min] | | 3:00 |
| Shore A/D after 3 days at 23° C. | | 59/<20 |
| after 14 days at 23° C. | | 54/<20 |
| after 3 days at 23° C. + 3 days at 50° C. | | 51/<20 |
| Tg [° C.] | 1st heating | −7.5 |
| | 2nd heating | 3.0 |
| | 3rd heating | 5.0 |
| Tear propagation resistance | [N/mm] | 11.3 |
| Nominal elongation at break | [%] | 295 |
| Breaking stress | [MPa] | 5.7 |

Various aspects of the subject matter described herein are set out in the following numbered Clauses:

Clause 1. A process for preparing prepolymers having isocyanate groups and having an NCO content of 2.8% to 18.0% by weight, a mean isocyanate functionality of 1.9 to 3.0 and a viscosity, measured to DIN EN ISO 3219, of max. 3000 mPas at 23° C., wherein 1,5-diisocyanatopentane and/or 1,6-diisocyanatohexane are reacted with A) at least one polyester polyol of mean functionality from 1.9 to 2.3 and of number-average molecular weight from 300 to 3000 g/mol, prepared from aliphatic dicarboxylic acids and/or anhydrides thereof with excess amounts of polyfunctional alcohols, where the polyfunctional alcohols are branched aliphatic diols to an extent of at least 30% by weight, based on the total amount of polyfunctional alcohols, and B) at least one polycaprolactone polyester of mean functionality from 2.0 to 3.0 and number-average molecular weight from 176 to 2000 g/mol, at temperatures of 20 to 200° C., observing an equivalents ratio of isocyanate groups to hydroxyl groups of 4:1 to 200:1, wherein the proportion of the polyester component A) in the total amount of the polyester components A) and B) converted is from 15% to 70% by weight.

Clause 2. The process as in Clause 1, wherein the polyol components A) and B) are reacted with the diisocyanate(s) as a mixture or successively in any sequence.

Clause 3. A process for preparing prepolymers having isocyanate groups and having an NCO content of 2.8% to 18.0% by weight, a mean isocyanate functionality of 1.9 to 3.0 and a viscosity, measured to DIN EN ISO 3219, of max. 3000 mPas at 23° C., characterized in that 1,5-diisocyanatopentane and/or 1,6-diisocyanatohexane are reacted in separate reactions with A) at least one polyester polyol of mean functionality from 1.9 to 2.3 and of number-average molecular weight from 300 to 3000 g/mol, prepared from aliphatic dicarboxylic acids and/or anhydrides thereof with excess amounts of polyfunctional alcohols, where the polyfunctional alcohols are branched aliphatic diols to an extent of at least 30% by weight, based on the total amount of polyfunctional alcohols, and B) at least one polycaprolactone polyester of mean functionality from 2.0 to 3.0 and number-average molecular weight from 176 to 2000 g/mol, at temperatures of 20 to 200° C., observing an equivalents ratio of isocyanate groups to hydroxyl groups of 4:1 to 200:1, and the prepolymers thus obtained are blended with one another in such a way that the proportion of the polyester component A) in the total amount of the polyester components A) and B) converted is from 15% to 70% by weight.

Clause 4. A process for preparing prepolymers having isocyanate groups and having an NCO content of 2.8% to 18.0% by weight, a mean isocyanate functionality of 1.9 to 3.0 and a viscosity, measured to DIN EN ISO 3219, of max. 3000 mPas at 23° C., characterized in that 1,5-diisocyanatopentane and/or 1,6-diisocyanatohexane are reacted in multiple individual reactions with mixtures of A) at least one polyester polyol of mean functionality from 1.9 to 2.3 and of number-average molecular weight from 300 to 3000 g/mol, prepared from aliphatic dicarboxylic acids and/or anhydrides thereof with excess amounts of polyfunctional alcohols, where the polyfunctional alcohols are branched aliphatic diols to an extent of at least 30% by weight, based on the total amount of polyfunctional alcohols, with B) at least one polycaprolactone polyester of mean functionality from 2.0 to 3.0 and number-average molecular weight from 176 to 2000 g/mol, at temperatures of 20 to 200° C., observing an equivalents ratio of isocyanate groups to hydroxyl groups of 4:1 to 200:1, and the prepolymers thus obtained are blended with one another in such a way that the proportion of the polyester component A) in the total amount of the polyester components A) and B) converted is from 15% to 70% by weight.

Clause 5. A process for preparing prepolymers having isocyanate groups and having an NCO content of 2.8% to 18.0% by weight, a mean isocyanate functionality of 1.9 to 3.0 and a viscosity, measured to DIN EN ISO 3219, of max. 3000 mPas at 23° C., characterized in that 1,5-diisocyanatopentane and/or 1,6-diisocyanatohexane are reacted in separate reactions with i) a mixture/mixtures of A) at least one polyester polyol of mean functionality from 1.9 to 2.3 and of number-average molecular weight from 300 to 3000 g/mol, prepared from aliphatic dicarboxylic acids and/or anhydrides thereof with excess amounts of polyfunctional alcohols, where the polyfunctional alcohols are branched aliphatic diols to an extent of at least 30% by weight, based on the total amount of polyfunctional alcohols, with B) at least one polycaprolactone polyester of mean functionality from 2.0 to 3.0 and number-average molecular weight from 176 to 2000 g/mol, and ii) at least one polyester polyol according to A, and/or iii) at least one polyester polymer according to B, at temperatures of 20 to 200° C., observing an equivalents ratio of isocyanate groups to hydroxyl groups of 4:1 to 200:1, and the prepolymers thus obtained are blended with one another in such a way that the proportion of the polyester component A) in the total amount of the polyester components A) and B) converted is from 15% to 70% by weight.

Clause 6. The process for preparing prepolymers having isocyanate groups as in any of clauses 1 to 5, characterized in that the proportion of the polyester component A), based on the total amount of the polyester components A) and B) used, is 20% to 65% by weight.

Clause 7. The process for preparing prepolymers having isocyanate groups as in any of Clauses 1 to 6, characterized in that the branched aliphatic diols used for preparation of component A) are those of the general formula HO—X—OH in which X is a branched alkyl or alkenyl radical having 3 to 36 carbon atoms.

Clause 8. The process for preparing prepolymers having isocyanate groups as in any of Clauses 1 to 6, characterized in that component A) comprises polyester polyols based on succinic acid and/or adipic acid, ethane-1,2-diol, butane-1,4-diol, hexane-1,6-diol, glycerol and/or 1,1,1-trimethylolpropane, and the branched aliphatic diols butane-1,3-diol, neopentyl glycol, 2-butyl-2-ethylpropane-1,3-diol, 2,2,4-trimethylpentane-1,5-diol and 2,2,4- and/or 2,4,4-trimethylhexanediol.

Clause 9. The process for preparing prepolymers having isocyanate groups as in any of Clauses 1 to 8, characterized in that component B) comprises polyester polyols which have been prepared by ring opening polymerization from ε-caprolactone using butane-1,4-diol, diethylene glycol, neopentyl glycol, hexane-1,6-diol, glycerol and/or 1,1,1-trimethylolpropane as starter molecule.

Clause 10. A process for preparing prepolymers having isocyanate groups as in any of Clauses 1 to 9, characterized in that, after the reaction or blending, excess unconverted monomeric diisocyanates are removed by thin-film distillation of the prepolymers having isocyanate groups.

Clause 11. Prepolymers having isocyanate groups and having an NCO content of 2.8% to 18.0% by weight, a mean isocyanate functionality of 1.9 to 3.0 and a viscosity, measured to DIN EN ISO 3219, of max. 3000 mPas at 23° C., obtainable by a process as in any of Clauses 1 to 10.

Clause 12. The use of the prepolymers having isocyanate groups as in Clause 11 as starting components in the production of polyurethane polymers.

Clause 13. Coating compositions comprising prepolymers having isocyanate groups as in Clause 11.

Clause 14. Substrates coated with coating compositions as in Clause 13.

Clause 15. Moldings comprising prepolymers having isocyanate groups as in Clause 11.

The invention claimed is:

1. A process for preparing prepolymers having isocyanate groups and having an NCO content of 2.8% to 18.0% by weight, a mean isocyanate functionality of 1.9 to 3.0 and a viscosity, measured to DIN EN ISO 3219, of max. 3000 mPas at 23° C., comprising reacting 1,5-diisocyanatopentane and/or 1,6-diisocyanatohexane with:
A) at least one polyester polyol of mean functionality from 1.9 to 2.3 and of number-average molecular weight from 300 to 3000 g/mol, prepared from aliphatic dicarboxylic acids and/or anhydrides thereof with excess amounts of polyfunctional alcohols, wherein the polyfunctional alcohols are branched aliphatic diols to an extent of at least 30% by weight, based on the total amount of polyfunctional alcohols, and B) at least one polycaprolactone polyester of mean functionality from 2.0 to 3.0 and number-average molecular weight from 176 to 2000 g/mol, at temperatures of 20 to 200° C., observing an equivalents ratio of isocyanate groups to hydroxyl groups of 4:1 to 200:1, wherein the proportion of the polyester component A) in the total amount of the polyester components A) and B) converted is from 15% to 70% by weight.

2. The process according to claim 1, wherein the polyol components A) and B) are reacted with the diisocyanate(s) as a mixture or successively in any sequence.

3. A process for preparing prepolymers having isocyanate groups and having an NCO content of 2.8% to 18.0% by weight, a mean isocyanate functionality of 1.9 to 3.0 and a viscosity, measured to DIN EN ISO 3219, of max. 3000 mPas at 23° C., comprising reacting in separate reactions 1,5-diisocyanatopentane and/or 1,6-diisocyanatohexane with A) at least one polyester polyol of mean functionality from 1.9 to 2.3 and of number-average molecular weight from 300 to 3000 g/mol, prepared from aliphatic dicarboxylic acids and/or anhydrides thereof with excess amounts of polyfunctional alcohols, where the polyfunctional alcohols are branched aliphatic diols to an extent of at least 30% by weight, based on the total amount of polyfunctional alcohols, and B) at least one polycaprolactone polyester of mean functionality from 2.0 to 3.0 and number-average molecular weight from 176 to 2000 g/mol, at temperatures of 20 to 200° C., observing an equivalents ratio of isocyanate groups to hydroxyl groups of 4:1 to 200:1, and the prepolymers thus obtained are blended with one another in such a way that the proportion of the polyester component A) in the total amount of the polyester components A) and B) converted is from 15% to 70% by weight.

4. A process for preparing prepolymers having isocyanate groups and having an NCO content of 2.8% to 18.0% by weight, a mean isocyanate functionality of 1.9 to 3.0 and a viscosity, measured to DIN EN ISO 3219, of max. 3000 mPas at 23° C., comprising reacting in multiple individual reactions 1,5-diisocyanatopentane and/or 1,6-diisocyanatohexane with mixtures of A) at least one polyester polyol of mean functionality from 1.9 to 2.3 and of number-average molecular weight from 300 to 3000 g/mol, prepared from aliphatic dicarboxylic acids and/or anhydrides thereof with excess amounts of polyfunctional alcohols, where the polyfunctional alcohols are branched aliphatic diols to an extent of at least 30% by weight, based on the total amount of polyfunctional alcohols, with B) at least one polycaprolactone polyester of mean functionality from 2.0 to 3.0 and number-average molecular weight from 176 to 2000 g/mol, at temperatures of 20 to 200° C., observing an equivalents ratio of isocyanate groups to hydroxyl groups of 4:1 to 200:1, and the prepolymers thus obtained are blended with one another in such a way that the proportion of the polyester component A) in the total amount of the polyester components A) and B) converted is from 15% to 70% by weight.

5. A process for preparing prepolymers having isocyanate groups and having an NCO content of 2.8% to 18.0% by weight, a mean isocyanate functionality of 1.9 to 3.0 and a viscosity, measured to DIN EN ISO 3219, of max. 3000 mPas at 23° C., comprising reacting 1,5-diisocyanatopentane and/or 1,6-diisocyanatohexane in separate reactions with i) a mixture/mixtures of
A) at least one polyester polyol of mean functionality from 1.9 to 2.3 and of number-average molecular weight from 300 to 3000 g/mol, prepared from aliphatic dicarboxylic acids and/or anhydrides thereof with excess amounts of polyfunctional alcohols, where the polyfunctional alcohols are branched aliphatic diols to an extent of at least 30% by weight, based on the total amount of polyfunctional alcohols, with B) at least one polycaprolactone polyester of mean functionality from 2.0 to 3.0 and number-average molecular weight from 176 to 2000 g/mol, and ii) at least one polyester polyol according to A, and/or iii) at least one polyester polymer according to B, at temperatures of 20 to 200° C., observing an equivalents ratio of isocyanate groups to hydroxyl groups of 4:1 to 200:1, and the prepolymers thus obtained are blended with one another such that the proportion of the polyester component A) in the total amount of the polyester components A) and B) converted is from 15% to 70% by weight.

6. The process for preparing prepolymers having isocyanate groups according to claim 1, wherein the proportion of the polyester component A), based on the total amount of the polyester components A) and B) used, is 20% to 65% by weight.

7. The process for preparing prepolymers having isocyanate groups according to claim 1, wherein the branched aliphatic diols used for preparation of component A) are those of the general formula

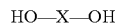

in which X is a branched alkyl or alkenyl radical having 3 to 36 carbon atoms.

8. The process for preparing prepolymers having isocyanate groups according to claim 1, wherein component A) comprises polyester polyols based on succinic acid and/or adipic acid, ethane-1,2-diol, butane-1,4-diol, hexane-1,6-diol, glycerol and/or 1,1,1-trimethylolpropane, and the branched aliphatic diols butane-1,3-diol, neopentyl glycol, 2-butyl-2-ethylpropane-1,3-diol, 2,2,4-trimethylpentane-1,5-diol and 2,2,4- and/or 2,4,4-trimethylhexanediol.

9. The process for preparing prepolymers having isocyanate groups according to claim 1, wherein component B) comprises polyester polyols which have been prepared by ring opening polymerization from ε-caprolactone using butane-1,4-diol, diethylene glycol, neopentyl glycol, hexane-1,6-diol, glycerol and/or 1,1,1-trimethylolpropane as starter molecule.

10. A process for preparing prepolymers having isocyanate groups according to claim 1, wherein, after the reaction or blending, excess unconverted monomeric diisocyanates are removed by thin-film distillation of the prepolymers having isocyanate groups.

11. Prepolymers having isocyanate groups and having an NCO content of 2.8% to 18.0% by weight, a mean isocyanate functionality of 1.9 to 3.0 and a viscosity, measured to DIN EN ISO 3219, of max. 3000 mPas at 23° C., obtained by the process according to claim 1.

12. In a process for production of polyurethane polymers, the improvement comprising including the prepolymers according to claim 11 as starting components.

13. A coating composition comprising the prepolymers having isocyanate groups according to claim 11.

14. A substrate coated with the coating composition according to claim 13.

15. A molding comprising the prepolymers having isocyanate groups according to claim 11.

* * * * *